(12) United States Patent
Zhang

(10) Patent No.: US 9,969,925 B2
(45) Date of Patent: May 15, 2018

(54) COMPOSITION OF WELLBORE CLEANING AGENT

(71) Applicant: Wellbore Chemicals LLC, Katy, TX (US)

(72) Inventor: Jinguo Zhang, Katy, TX (US)

(73) Assignee: Wellbore Chemicals LLC, Katy, TX (US)

( * ) Notice: Subject to any disclaimer, the term of this patent is extended or adjusted under 35 U.S.C. 154(b) by 0 days. days.

(21) Appl. No.: 14/843,555

(22) Filed: Sep. 2, 2015

(65) Prior Publication Data

US 2016/0177169 A1  Jun. 23, 2016

Related U.S. Application Data

(60) Provisional application No. 62/095,129, filed on Dec. 22, 2014.

(51) Int. Cl.
C09K 8/52 (2006.01)

(52) U.S. Cl.
CPC ............ C09K 8/52 (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 5,458,197 A | 10/1995 | Chan | |
| 5,898,026 A * | 4/1999 | Yianakopoulos | C09K 19/00 510/236 |
| 6,672,388 B2 | 1/2004 | McGregor et al. | |
| 7,902,123 B2 | 3/2011 | Harrison et al. | |
| 8,584,760 B2 | 11/2013 | Arvie, Jr. et al. | |

OTHER PUBLICATIONS

Rosen, Miton J. "Surfactants and Interfacial Phenomena", 3rd ed.; Wiley-Interscience; Hoboken, NJ; 2004; 444pgs.

\* cited by examiner

*Primary Examiner* — Jeffrey Washville
(74) *Attorney, Agent, or Firm* — Karen B. Tripp

(57) ABSTRACT

A cleaning agent, which comprises a mutual solvent, a carrier fluid, a nonionic surfactant and another nonionic surfactant as co-surfactant. The cleaning agent can be used, for example, to clean oil and water based drilling mud and water-wet the surface.

15 Claims, No Drawings

COMPOSITION OF WELLBORE CLEANING AGENT

CROSS-REFERENCE TO RELATED APPLICATION

This application claims the benefit of U.S. Provisional Application No. 62/095,129, filed Dec. 22, 2014.

BACKGROUND OF INVENTION

1) Field of the Invention

This invention relates to the formulation of a cleaning agent which is capable of cleaning wellbore and water-wet the surface.

2) Background Information

Various fluids, including oil based mud (OBM), synthetic oil based mud (SBM) and/or water based mud (WBM), were applied during the wellbore drilling process for the exploration and/or production of fossil fuel. During drilling, mud is circulated continuously and leaves the wellbore surface and other surfaces contaminated. Effective drilling mud removal is a necessary for both cementing success and completion operations. Before cementing, the casing and formation need to be water-wet so that cement can bond with both casing and formation. Before completion of a well, it is necessary to displace the mud and water-wet the casing, tubular so that clean fluid, typically clear solids-free brine, can be placed into the well. Conventional cleaning methods use fresh water or seawater treated with cleaning agents to displace the mud and water-wet the surfaces. This low-density treating fluid creates a negative differential pressure between the working fluid and the formation, which frequently require unacceptable pump pressure. Weighed spacers or cleaning fluids can overcome the differential pressure problem. A weighted spacer generally composes of a viscosifier, weighting material, and cleaning agent. Xanthan gum and other water-soluble polysaccharides are frequently used as viscosifier. Barite, calcium carbonate and others solid material are frequently used as weighting material. Heavy weight brine can be used as weighting material as well. However, the weighted cleaning fluids generally have limitation on the cleaning efficiency.

Accordingly, there is a demand for highly effective cleaning agents that can be applied in displacement spacers to remove mud residue and leave the surface clean and water-wet.

SUMMARY OF INVENTION

The present invention provides an improved surfactant blend, particularly useful in well cleanout, cementing, well completion, in connection with the exploration and production of oil and gas. This specific surfactant blend is stable over a wide range of temperature and can be mixed with any type of aqueous fluids including brine.

DETAILED DESCRIPTION

Embodiments disclosed herein relate to fluids used in cleaning wellbore surface including casing, tubular, and drilling pipe, as well as formation. More particularly, embodiments disclosed herein relate to use of fatty alcohol ethoxylates with specific value of hydrophilic-lipophilic balance (HLB) to remove drilling fluid residue on wellbore surfaces and water-wet surfaces.

The HLB value of a surfactant is a measure of the degree to which it is hydrophilic or lipophilic. A HLB value of 0 corresponds to a completely hydrophobic molecule, while a HLB value of 20 corresponds to a completely hydrophilic molecule. HLB value can be used to predict the surfactant properties of a molecule. For example, a surfactant with HLB value of 3 to 6 is W/O (water in oil) emulsifier. A surfactant with HLB value of 12 to 16 is O/W (oil in water) emulsifier. Typical oil based mud is invert oil emulsion mud or water in oil emulsion mud.

There are four types of surfactants, including anionic surfactants, cationic surfactants, amphoteric surfactants in which the charge depends on pH, and nonionic surfactants. Nonionic surfactants are of particular interest due to its stability in presence of ionic compound like monovalent and/or divalent brines, largely used in oil and gas field. It is contemplated that a cleaning agent having at least two surfactants, wherein the total surfactant concentration in the cleaning agent is about 20% to 80% by weight and preferably 40% to 60% by weight. The HLB value of the first surfactant ranges from 6.0 to 12.0 and preferably from 10.0 to 11.9. The HLB value of the second surfactant ranges from 12.0 to 20.0 and preferably from 12.0 to 14.0. Both surfactants can be any of the four types of surfactants, wherein nonionic surfactant is preferred. The weight ratio of the first surfactant to the second surfactant ranges from 1:0.1 to 1:10 and preferable from 1:0.5 to 1:2. Numerous surfactants fit the criteria. A few examples of surfactants having a HLB value ranging from 10.0 to 12.0 and from 12.0 to 15.0 are listed in Table 1 and Table 2. Alcohol ethoxylates are a major class of non-ionic surfactants which are used in laundry detergents, household and industrial cleaners, cosmetics, agriculture, and in textile, paper, oil and other process industries. The Alcohol ethoxylate is defined to be of the basic structure Cx-yEn. The subscript following the 'C' indicates the range of carbon chain units. Alcohol ethoxylates with carbon unit range between C6 to C18 are most used. The carbon unit can be aliphatic, alicyclic or aromatic. In other words, the carbon unit can be straight or branched, cyclic or aromatic, saturated or unsaturated and may contain carbon, oxygen, hydrogen, nitrogen, sulfur etc. Further, alcohol ethoxylates contain ethylene oxide (E) chain attached to the alcohol. The subscript following the 'E' indicates the degree of polymerization of ethylene oxide units. The performance properties of these non-ionic surfactants can be adjusted by the alcohol selection and by the length of the hydrophilic polyethylene glycol chain. The HLB values of those alcohol ethoxylates may vary accordingly. An example of a nonionic surfactant is sold under the trademark WC-100, which is an ethoxylated alcohol having an alkyl chain length of C6, which has a HLB value at about 11.8. Other nonionic surfactants are sold under the trademarks WC-102 and WC-104, which are ethoxylated alcohols having an alkyl chain length of C8-C16, which has a HLB value at about 13.1 and 12.1, respectively. Those surfactants meet the criteria to be the surfactant and the co-surfactant in the cleaning agent and are available from Wellbore Chemicals LLC in Houston, Tex.

TABLE 1

Examples of surfactants having a HLB value ranging from 10.0 to 11.9

| Surfactant | HLB value |
|---|---|
| PEG-7 glyceryl cocoate | 10.0 |
| PEG-20 almond glycerides | 10.0 |
| PEG-25 hydrogenated castor oil | 10.8 |
| C12-C14 alcohol ethoxylates 4.5 mol | 10.1 |

TABLE 1-continued

Examples of surfactants having a HLB
value ranging from 10.0 to 11.9

| Surfactant | HLB value |
|---|---|
| C12-C14 alcohol ethoxylates 5 mol | 10.2 |
| C12-C14 alcohol ethoxylates 5 mol | 10.5 |
| PEG-100 stearate | 11.0 |
| Polysorbate 85 | 11.0 |
| PEG-7 olivate | 11.0 |
| Isotridecyl alcohol ethoxylate 6 mole | 11.3 |
| PEG-8 oleate | 11.6 |
| WC-100 ™ | 11.8 |

TABLE 2

Examples of Surfactants having a HLB
value ranging from 12.0 to 15.0

| Surfactant | HLB value |
|---|---|
| Polyglyceryl-3 methyglucose distearate | 12.0 |
| C10-C16 alcohol ethoxylate 6.5 mol | 12.0 |
| WC-104 ™ | 12.1 |
| Oleth-10 | 12.4 |
| Branched C13 alcohol ethoxylat 8 mol | 12.7 |
| Ceteth-10 | 12.9 |
| PEG-8 laurate | 13.0 |
| Nonylphenol ethoxylate 9 mol | 13.1 |
| WC-102 ™ | 13.1 |
| Hydrogenated castor Oil ethoxylate 50 mol | 13.5 |
| C10-C16 alcohol ethoxylate 9 mol | 13.5 |
| Castor oil ethoxylate 60 mol | 14.0 |
| Polysorbate 60 | 14.9 |
| Polysorbate 80 | 15.0 |

In addition to the surfactants, the cleaning agent may also contain at least one mutual solvent. A mutual solvent is miscible with more than one class of liquids. Acetone, for example, is miscible with water, alcohol, and ether. A mutual solvent is also known as a coupling agent because it can combine two ordinarily immiscible liquids together forming a clear solution. Examples of such solvents in the some embodiments include, but not limit to ethylene glycol monobutyl ether, diethylene glycol monobutyl ether, triethylene glycol monobutyl ether, propylene glycol monobutyl ether (PGMBE), dipropylene glycol monobutyl ether, tripropylene monobutyl ether, diethylene glycol monoethyl ether, dipropylene glycol monomethyl ether, butylcarbitol, various esters, such as ethyl acetate, butyl acetate et al. In a particular embodiment, the mutual solvent is ethylene glycol monobutyl ether (EGMBE) or its mixture with other mutual solvents. In addition to the surfactants and mutual solvents, the cleaning fluid may contain at least one carrier fluid, which is linear and/or branched alkyl alcohol. Examples of such carrier fluid in the some embodiments include, but not limit to, methanol, ethanol, n-propanol, isopropyl alcohol (IPA), butyl alcohol, pentanol, branched and linear hexanol, 2-ethylhexanol, 1-heptanol, 2-heptanol, octanol, alkyl alcohol C6 to C13 category, diols, for example, ethane-1,2-diol, propane-1,2-diol, propane-1,2,3-triol, prop-2-ene-1-ol, prop-2-in-1-ol et al. In a particular embodiment, the carrier fluid is 2-ethylhexanol or its mixture with other alcohols. When the base fluid comprises a blend of carrier fluid and mutual solvent, the blend may include any ranges up to 1:4 by weight. In a preferred embodiment, the blend may range from 1:1 to 1:3 by weight. Further, when formulated with surfactants, the cleaning agent comprises may include from 20% to 60% by weight of the based fluid and preferably 30% to 50% by weight. In a particular embodiment, the cleaning fluid may include about 10 to 20% by weight of a carrier fluid, about 10 to 40% by weight of a mutual solvent, and about 40 to 80% by weight of surfactants.

An oleaginous or aqueous fluid may be formulated into the cleaning fluids. The aqueous fluid may include at least one of fresh water, seawater, brine, mixtures of water and water-soluble organic compounds and mixtures thereof. For example, the aqueous fluid may be formulated with mixtures of desired salts in fresh water. Such salts may include, but are not limited to metal halides, hydroxides, formates or carboxylates, for example, the brine may include seawater, diluted sea water, In a particular embodiment, a brine may include halide or carboxylate salts of mono- or divalent cations of metals, such as sodium, potassium, cesium, calcium, and/or Zinc. Corrosion inhibitors, biocides, friction reducers and other oil field chemicals may also be formulated into the cleaning fluids.

EXAMPLE

The disclosure has been generally described. The following example is given to further illustrate the application and compositions of the present disclosure. In particular, the composition of various cleaning agents tested, which containing a carrier fluid, mutual solvent, surfactant and co-surfactant, have been listed in Table 3. All the chemicals are commercially available from chemical companies including Wellbore Chemicals LLC (Katy Tex.). Cleaning efficiency tests were based on a conventional jar test. To a clean 4 OZ wide mouth glass bottle, 20 ml oil based mud was added and the mud was swiveled to cover the inner wall of jar. In another 4 OZ glass bottle, 20 ml of the formulated cleaning agent was mixed with 60 ml 11.6 ppg (sg 1.39) calcium chloride brine to form an 80 ml cleaning fluid. The cleaning fluid was added into the glass bottle that was covered by 20 ml oil based mud. After shaking for 30 seconds, all the liquid was poured out and the bottle was rinsed using tap water twice. The wall cleanness and wettability were observed and recorded. The cleaning efficiency was ranked from 0 to 10. A number 0 indicates that mud was still attached to the wall and there is no cleaning efficiency. A number 10 indicates an excellent cleaning efficiency that yields a clean bottle without any mud residue and fully water-wet. A cleaning efficiency should be numbered at least 8 to be considered acceptable.

TABLE 3A different surfactant and co-surfactant

| | | | Sample No. | | | | | | | |
|---|---|---|---|---|---|---|---|---|---|---|
| Component | Function | HLB | 1 | 2 | 3 | 4 | 5 | 6 | 7 | 8 |
| EGMBE | Mutual solvent | | 20 | 20 | 20 | 20 | 20 | 20 | 20 | 20 |
| 2-Ethylhexanol | Carrier fluid | | 10 | 10 | 10 | 10 | 10 | 10 | 10 | 10 |
| Isotridecyl alcohol ethoxylate 6 mol | Surfactant | 11.3 | 20 | 20 | 20 | 20 | — | — | — | — |
| WC-100 | Surfactant | 11.8 | — | — | — | — | 20 | 20 | 20 | 20 |
| C10-C16 alcohol ethoxylate 6.5 mol | co-Surfactant | 12.0 | 20 | — | — | — | 20 | — | — | — |

TABLE 3A-continued different surfactant and co-surfactant

| Component | Function | HLB | Sample No. 1 | 2 | 3 | 4 | 5 | 6 | 7 | 8 |
|---|---|---|---|---|---|---|---|---|---|---|
| WC-104 | co-Surfactant | 12.1 | — | 20 | — | — | — | 20 | — | — |
| Branched C13 alcohol ethoxylat 8 mol | co-Surfactant | 12.7 | — | — | 20 | — | — | — | 20 | — |
| WC-102 | co-Surfactant | 13.1 | — | — | — | 20 | — | — | — | 20 |
| Cleaning efficiency | | | 9 | 10 | 9 | 9 | 10 | 10 | 9 | 8 |

TABLE 3B different mutual solvent and carrier fluid

| Component | Function | HLB | Sample No. 9 | 10 | 11 | 12 |
|---|---|---|---|---|---|---|
| EGMBB | | | — | 10 | 10 | — |
| PGMBE | Mutual solvent | | 20 | 10 | 10 | 15 |
| Isopropanol | Carrier fluid | | 10 | 10 | 5 | — |
| 2-Ethylhexanol | Carrier fluid | | — | — | 5 | 10 |
| WC-100 | Surfactant | 11.8 | 20 | 20 | 20 | 25 |
| WC-104 | co-Surfactant | 12.1 | 20 | 20 | 20 | 20 |
| Cleaning efficiency | | | 8 | 9 | 10 | 9+ |

TABLE 3C mixture of surfactant and co-surfactant

| Component | Function | HLB | Sample No. 13 | 14 | 15 | 16 | 17 | 18 |
|---|---|---|---|---|---|---|---|---|
| EGMBE | Mutual solvent | | 20 | 20 | 20 | 20 | 20 | 20 |
| 2-Ethylhexanol | Carrier fluid | | 10 | 10 | 10 | 10 | 10 | 10 |
| Isotridecyl alcohol ethoxylate 6 mol | Surfactant | 11.3 | — | 20 | 10 | 10 | 10 | 5 |
| WC-100 | Surfactant | 11.8 | 20 | — | 10 | 10 | 10 | 15 |
| C10-C16 alcohol ethoxylate 6.5 mol | co-Surfactant | 12.0 | 10 | 10 | 20 | — | 10 | 5 |
| Branched C13 alcohol ethoxylat 8 mol | co-Surfactant | 12.7 | 10 | 10 | — | 20 | 10 | 15 |
| Cleaning efficiency | | | 9+ | 9 | 9 | 10 | 10 | 10 |

While limited numbers of embodiment of the invention have been shown and described, modifications can be made by those skilled in the art without departing from the spirit and scope of the invention as recited in appended claims. The disclosures of all patents, patent applications, and publications cited herein are incorporated by reference, to the extent that they provide exemplary or other details supplementary to those set forth herein.

REFERENCE

U.S. PATENT DOCUMENTS

| | | |
|---|---|---|
| 8,584,760 B2 | November 2013 | Arvie et al |
| 7,902,123 B2 | March 2011 | Harrsion et al |
| 6,672,388 B2 | January 2004 | McGregor et al |
| 5,458,197 | October 1995 | Chan |

OTHER PUBLICATIONS

Milton J. Rosen; Surfactant and interfacial phenomena ($3^{rd}$ edition), 2004, John Wiley & Sons, Inc. Hoboken, N.J.

What is claimed:

1. A wellbore cleaning agent suited for use in subterranean oil and gas wellbores comprising:
   a mutual solvent selected from the group of glycol ether solvents consisting of ethylene glycol monobutyl ether, diethylene glycol monobutyl ether, triethylene glycol monobutyl ether, propylene glycol monobutyl ether, dipropylene glycol monobutyl ether, tripropylene monobutyl ether, diethylene glycol monoethyl ether, diproylene glycol monomethyl ether, butylcarbitol, and combinations thereof;
   a carrier fluid selected from the group consisting of linear and branched alkyl alcohols;
   a first nonionic surfactant having an HLB value in a range from about 10.0 to about 11.9, the first nonionic surfactant selected from the group consisting of: PEG-7 glyceryl cocoate, PEG-20 almond glycerides, PEG-25 hydrogenated castor oil, $C_{12}$-$C_{14}$ alcohol ethoxylates, PEG-100 stearate, polysorbate 85, PEG-7 olivate, isotridecyl alcohol ethoxylate, PEG-8 oleate, ethoxylated alcohols having an alkyl chain length of C6, and combinations thereof; and
   a second nonionic surfactant having an HLB value in a range from about 12.0 to about 15.0, the second nonionic surfactant selected from the group consisting of: alcohol ethoxylates having 6 to 18 carbons, and combinations thereof;
   wherein the cleaning agent is tolerant to brine in the wellbore.

2. A subterranean wellbore cleaning agent composition as claimed in claim 1, wherein the mutual solvent is selected from the group consisting of ethylene glycol monobutyl ether, propylene glycol monobutyl ether, derivatives thereof, and combinations thereof.

3. A subterranean wellbore cleaning agent composition as claimed in claim 1, wherein the carrier fluid is selected from the group consisting of isopropyl alcohol, n-propanol, n-butanol, tert-butanol, n-pentanol, n-hexanol, 2-ethyl-hexanol, derivatives thereof, and combinations thereof.

4. A subterranean wellbore cleaning agent composition as claimed in claim 1, wherein the first nonionic surfactant is selected from the group consisting of alkylphenol ethoxylate, alcohol ethoxylate, and combinations thereof.

5. A subterranean wellbore cleaning agent composition as claimed in claim 1, wherein the second nonionic surfactant is selected from the group consisting of alkylphenol ethoxylate, alcohol ethoxylate, and combinations thereof.

6. A subterranean wellbore cleaning agent composition as claimed in claim 1, comprising from about 5% to 60% by weight of the mutual solvent, from about 10% to 50% by weight of the first nonionic surfactant, from about 10% to 50% by weight of the second nonionic surfactant, and from about 5% to 30% by weight of the carrier fluid.

7. A subterranean wellbore cleaning agent composition as claimed in claim 1, further comprising water or brine.

8. A subterranean wellbore cleaning agent composition as claimed in claim 4, wherein the first nonionic surfactant is an ethoxylated alcohol having an alkyl chain length of $C_6$ which has an HLB value of about 11.8.

9. A wellbore cleaning agent suited for use in subterranean oil and gas wellbores comprising:
   a mutual solvent selected from the group of glycol ether solvents consisting of ethylene glycol monobutyl ether, diethylene glycol monobutyl ether, triethylene glycol monobutyl ether, propylene glycol monobutyl ether, dipropylene glycol monobutyl ether, tripropylene monobutyl ether, diethylene glycol monoethyl ether, diproylene glycol monomethyl ether, butylcarbitol, and combinations thereof;
   a carrier fluid selected from the group consisting of linear and branched alkyl alcohols;
   a first nonionic surfactant having an HLB value in a range from about 10.0 to about 11.9, the first nonionic surfactant selected from the group consisting of: PEG-7 glyceryl cocoate, PEG-20 almond glycerides, PEG-25 hydrogenated castor oil, $C_{12}$-$C_{14}$ alcohol ethoxylates, PEG-100 stearate, polysorbate 85, PEG-7 olivate, isotridecyl alcohol ethoxylate, PEG-8 oleate, ethoxylated alcohols having an alkyl chain length of C6, and combinations thereof; and
   a second nonionic surfactant having an HLB value in a range from about 12.0 to about 15.0, the second nonionic surfactant selected from the group consisting of: polyglyceryl-3 methyglucose distearate, C10-C16 alcohol ethoxylate, ethoxylated alcohols having an alkyl chain length of C8-C16, Oleth-10, branched C13 alcohol ethoxylate, Ceteth-10, PET-8 laurate, nonylphenol ethoxylate, hydrogenated castor oil ethoxylate, castor oil ethoxylate, polysorbate 60, polysorbate 80, and combinations thereof;
   wherein the cleaning agent is tolerant to brine in the wellbore.

10. A subterranean wellbore cleaning agent composition as claimed in claim 9, wherein the mutual solvent is selected from the group consisting of ethylene glycol monobutyl ether, propylene glycol monobutyl ether, derivatives thereof, and combinations thereof.

11. A subterranean wellbore cleaning agent composition as claimed in claim 9, wherein the carrier fluid is selected from the group consisting of isopropyl alcohol, n-propanol, n-butanol, tert-butanol, n-pentanol, n-hexanol, 2-ethyl-hexanol, derivatives thereof, and combinations thereof.

12. A subterranean wellbore cleaning agent composition as claimed in claim 9, wherein the first nonionic surfactant is selected from the group consisting of alkylphenol ethoxylate, alcohol ethoxylate, and combinations thereof.

13. A subterranean wellbore cleaning agent composition as claimed in claim 9, wherein the second nonionic surfactant is selected from the group consisting of alkylphenol ethoxylate, alcohol ethoxylate, and combinations thereof.

14. A subterranean wellbore cleaning agent composition as claimed in claim 9, comprising from about 5% to 60% by weight of the mutual solvent, from about 10% to 50% by weight of the first nonionic surfactant, from about 10% to 50% by weight of the second nonionic surfactant, and from about 5% to 30% by weight of the carrier fluid.

15. A subterranean wellbore cleaning agent composition as claimed in claim 9, further comprising water or brine.

* * * * *